July 3, 1923.
N. C. DIVELBISS
AUTOMOBILE BRAKE
Filed Oct. 18, 1920
1,460,893
2 Sheets-Sheet 1
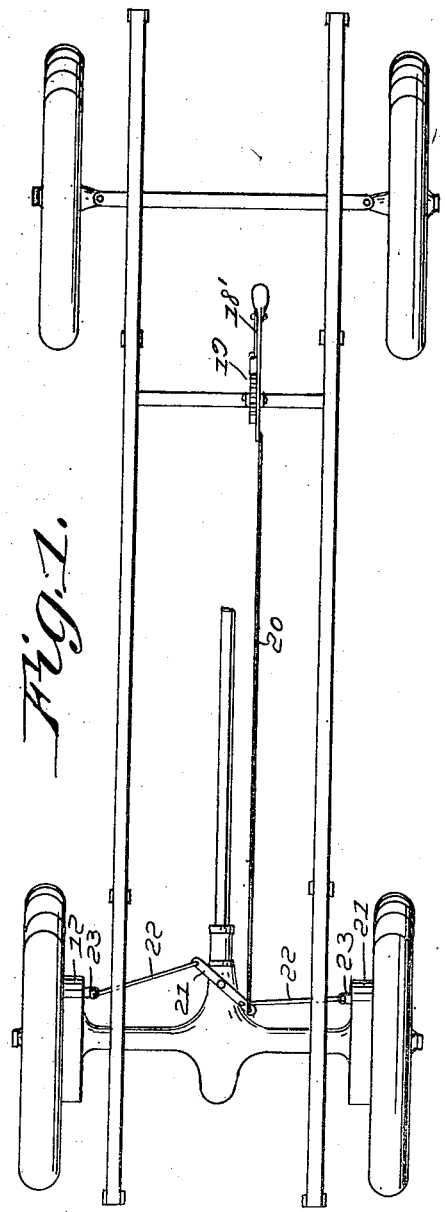
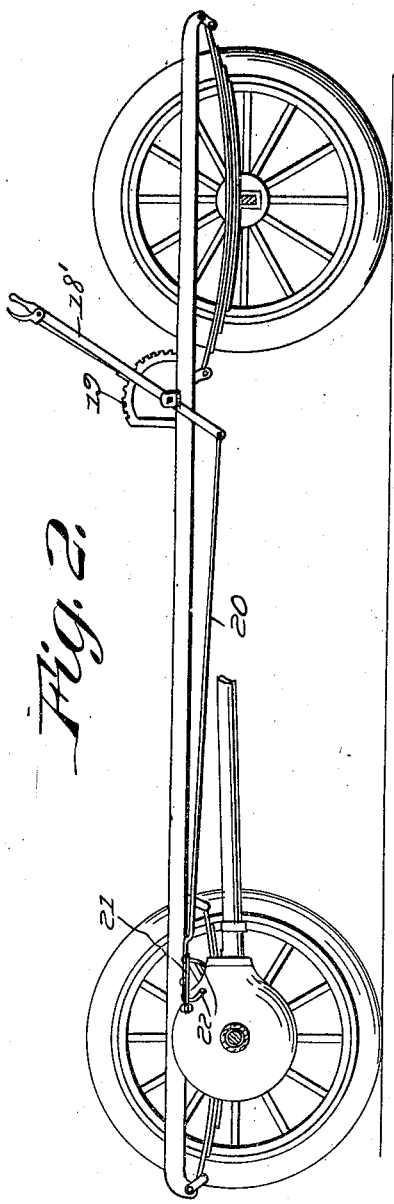
Inventor
N. C. Divelbiss,
By E. Hume Talbert
Attorney July 3, 1923.
N. C. DIVELBISS
1,460,893
AUTOMOBILE BRAKE
Filed Oct. 18, 1920   2 Sheets-Sheet 2
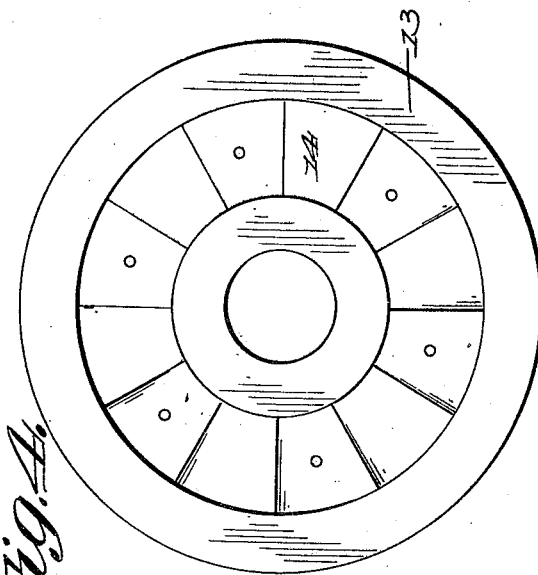
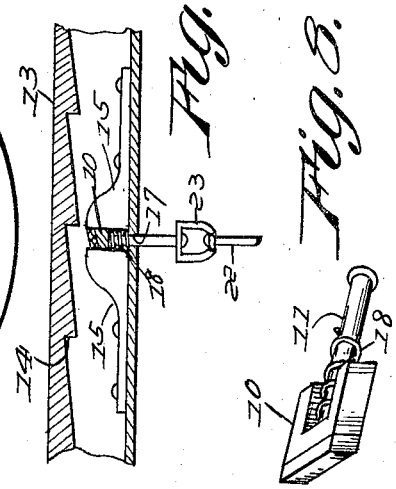
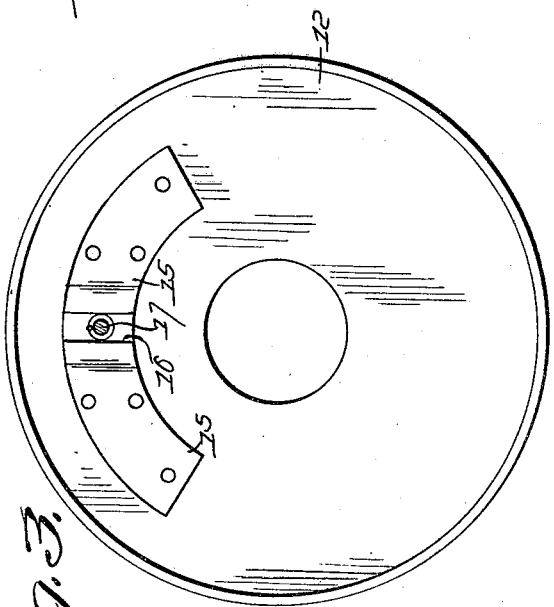
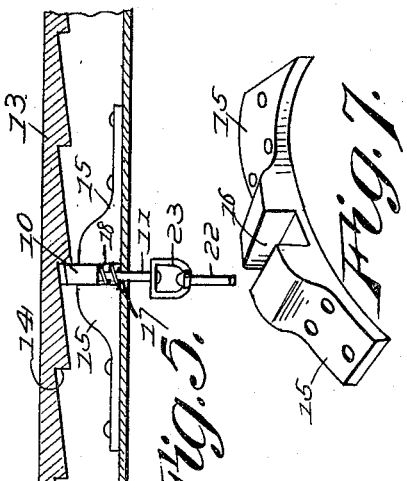

Patented July 3, 1923.

1,460,893

UNITED STATES PATENT OFFICE.

NEWTON C. DIVELBISS, OF SAN LEANDRO, CALIFORNIA.

AUTOMOBILE BRAKE.

Application filed October 18, 1920. Serial No. 417,557.

*To all whom it may concern:*

Be it known that I, NEWTON C. DIVELBISS, a citizen of the United States of America, residing at San Leandro, in the county of Alameda, and State of California, have invented new and useful Improvements in Automobile Brakes, of which the following is a specification.

The object of the invention is to provide a simple, inexpensive and efficient brake for automobiles and similar vehicles, designed, for example, to lock a car against retrograde movement and adapted for application to machines of the various commercial types under conditions representing a simplification of the form and construction embodied in my former application Number 362,450, filed March 1, 1920; and with these objects in view the invention consists in the construction and combination of parts of which a preferred embodiment is shown in the drawing, wherein:—

Figure 1 is a plan view of the apparatus applied in the operative position to a vehicle of the automobile type.

Figure 2 is a side view of the same.

Figure 3 is a face view of the brake casing.

Figure 4 is a similar view of the hub plate.

Figures 5 and 6 are detail sectional views of the lock mechanism respectively in engaged and disengaged positions.

Figure 7 is a detail view in perspective of one of the tongue or dog guides.

Figure 8 is a similar view of the tongue or dog.

In the illustrated embodiment of the invention the brake consists of a reciprocable tongue or dog 10 having a stem 11 mounted in a suitable guide formed in a housing 12 which spans and encloses a hub plate 13 provided with an annular series of ratchet teeth 14, the mounting of the tongue or dog being such as to adapt it for movement toward and from the plane of the hub plate for engagement with or disengagement from said ratchet teeth.

Secured to and carried by the housing 12 is a pair of tongue or dog guides 15 consisting of plates riveted or otherwise rigidly secured to the housing and having thickened inner ends providing perpendicular spaced walls 16 between which the tongue or dog slides when actuated by means of its stem 11 which operates in the guide opening 17. A spring 18 is preferably coiled around the stem of the tongue or dog between the outer end of the latter and the inner surface of the housing to yieldingly impel the dog or tongue toward the plane of the ratchet teeth 14 so that when released the tongue or dog promptly engages a tooth of the ratchet to lock the wheel carrying the hub plate against movement in one direction. The means for operating the tongue or dog for releasing the wheel may consist as illustrated in the drawings of a hand lever 18' operating in connection with a toothed segment 19 and connected by a rod 20 with a lever 21 which in turn is connected by a link 22 with a swivel 23 mounted upon the inner end of the stem 11. Obviously when the hand lever 18' is moved rearwardly, the lever 21 is moved to a position approaching parallelism with the rear axle of the vehicle and consequently the links 22 release their pull on the swivels 23 and the stems of the dogs 10, allowing the latter in virtue of the pressure exerted by the springs 18, to come in contact with the ratchet teeth. Obviously when they engage behind the perpendicular faces of the latter, retrograde or backward movement of the vehicle wheels is precluded. Forward movement is permitted, however, for then the slanting faces of the ratchet teeth engage the dogs pressing them back, this movement of the dogs being permitted by the sliding engagement which obviously obtains between the links 22, the stems 11 and the swivels 23. Forward movement of the handle 18' obviously results in rocking the lever 21 in a direction approaching a position parallel with the length of the vehicle and the links 22 thereupon exert a pull on the dogs and move them out of engagement with the ratchet teeth.

In applying the device to a car as will be obvious from the foregoing description, no change in the construction of the latter is required, the hub plate being applicable to the inner end of the hub in position for engagement by the dog or tongue carried by the housing which serves as a sand band or guard to protect the tongue or dog and the ratchet to prevent accumulations of dust from interfering with the proper operation thereof.

Having described the invention, what is claimed as new and useful is:

A vehicle brake having a hub plate provided with an annular series of ratchet teeth, a housing enclosing the hub plate and provided with guides having parallel faces disposed perpendicular to the plane of the housing, a dog reciprocably mounted between said guide faces for movement toward and from the plane of the ratchet teeth, a spring for yieldingly impelling the dog toward the plane of said ratchet teeth, and operating means connected with the dog for withdrawing the same in opposition to its actuating spring out of engagement with the ratchet teeth.

In testimony whereof he affixes his signature.

NEWTON C. DIVELBISS.